(12) United States Patent
Bui

(10) Patent No.: US 9,890,688 B2
(45) Date of Patent: Feb. 13, 2018

(54) TELESCOPICALLY CRUSHABLE AIR GUIDE FOR A MOTOR VEHICLE ENGINE RADIATOR AND VEHICLE PROVIDED WITH SAME

(71) Applicant: RENAULT s.a.s., Boulogne Billancourt (FR)

(72) Inventor: Joseph Bui, Les Mureaux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/896,587

(22) PCT Filed: Jun. 4, 2014

(86) PCT No.: PCT/FR2014/051327
§ 371 (c)(1),
(2) Date: Dec. 7, 2015

(87) PCT Pub. No.: WO2014/195636
PCT Pub. Date: Dec. 11, 2014

(65) Prior Publication Data
US 2016/0131020 A1    May 12, 2016

(30) Foreign Application Priority Data

Jun. 6, 2013 (FR) ...................... 13 55227

(51) Int. Cl.
*B60K 11/00* (2006.01)
*B60K 11/08* (2006.01)
(Continued)

(52) U.S. Cl.
CPC ............... *F01P 11/10* (2013.01); *B60K 11/04* (2013.01); *B60K 11/08* (2013.01); *F01P 1/06* (2013.01); *B60Y 2306/01* (2013.01)

(58) Field of Classification Search
CPC ....... B60K 11/04; B60K 11/08; B60K 11/085; B62D 25/081; B62D 25/085
(Continued)

(56) References Cited

U.S. PATENT DOCUMENTS 4,169,501 A * 10/1979 Takeuchi ............. B60K 11/085
123/41.49
7,690,703 B2 * 4/2010 Maruko ................... B60R 19/52
293/102

(Continued)

FOREIGN PATENT DOCUMENTS

| EP | 1 216 872 | 6/2002 |
| FR | 2 965 226 | 3/2012 |
| FR | 2 967 375 | 5/2012 |

OTHER PUBLICATIONS

International Search Report dated Aug. 26, 2014 in PCT/FR2014/051327 Filed Jun. 4, 2014.
(Continued)

*Primary Examiner* — James A Shriver, II
*Assistant Examiner* — Vaughn Coolman
(74) *Attorney, Agent, or Firm* — Oblon, McClelland, Maier & Neustadt, L.L.P.

(57) ABSTRACT

An air guide collects air from a grille located at the front of a vehicle engine compartment to a vertical radiator located in the engine compartment and which is fixed to a vehicle chassis. The air guide includes a main casing including an upper casing and a lower casing. The upper and lower casings include an opening toward the front to receive the air. The lower casing includes at least one substantially horizontal lower wall and two substantially vertical lateral walls. The lower casing axially and transversely abut the rear portion of the lower casing of the air guide relative to the chassis of the vehicle, at least in a lateral region of the lower casing, and a local structure for controlled preferred
(Continued)

compression of the walls of the lower casing, at least in a lower portion of the lateral region of the lower casing.

19 Claims, 3 Drawing Sheets

(51) Int. Cl.
*F01P 11/10* (2006.01)
*B60K 11/04* (2006.01)
*F01P 1/06* (2006.01)

(58) Field of Classification Search
USPC .......................................................... 180/68.1
See application file for complete search history.

(56) References Cited

U.S. PATENT DOCUMENTS

| | | | | |
|---|---|---|---|---|
| 8,196,998 B2* | 6/2012 | Ohno | ...................... | B60R 19/48 293/133 |
| 8,371,407 B2* | 2/2013 | Hassdenteufel | ..... | B62D 25/084 165/149 |
| 8,561,741 B2* | 10/2013 | Kurokawa | ............. | B60K 11/08 180/68.4 |
| 8,936,121 B2* | 1/2015 | Vacca | .................... | B60K 11/04 165/44 |
| 9,162,641 B2* | 10/2015 | Townson | .............. | B62D 25/084 180/68.6 |
| 9,539,934 B2* | 1/2017 | Fortin | .................... | B60R 19/023 |
| 9,676,422 B2* | 6/2017 | Schmidt | ................ | B62D 25/085 |
| 2006/0102109 A1* | 5/2006 | Becker | ................... | B60K 11/08 123/41.48 |
| 2010/0244481 A1* | 9/2010 | Ohno | ...................... | B60R 19/48 296/82 |
| 2011/0204680 A1* | 8/2011 | Fortin | .................... | B60R 19/18 296/193.1 |
| 2013/0220577 A1 | 8/2013 | Bignon et al. | | |
| 2016/0052559 A1* | 2/2016 | Schmidt | ................ | B60K 11/08 296/193.1 |

OTHER PUBLICATIONS

French Search Report dated Mar. 14, 2014 in French Application 1355227 Filed Jun. 6, 2013.

* cited by examiner

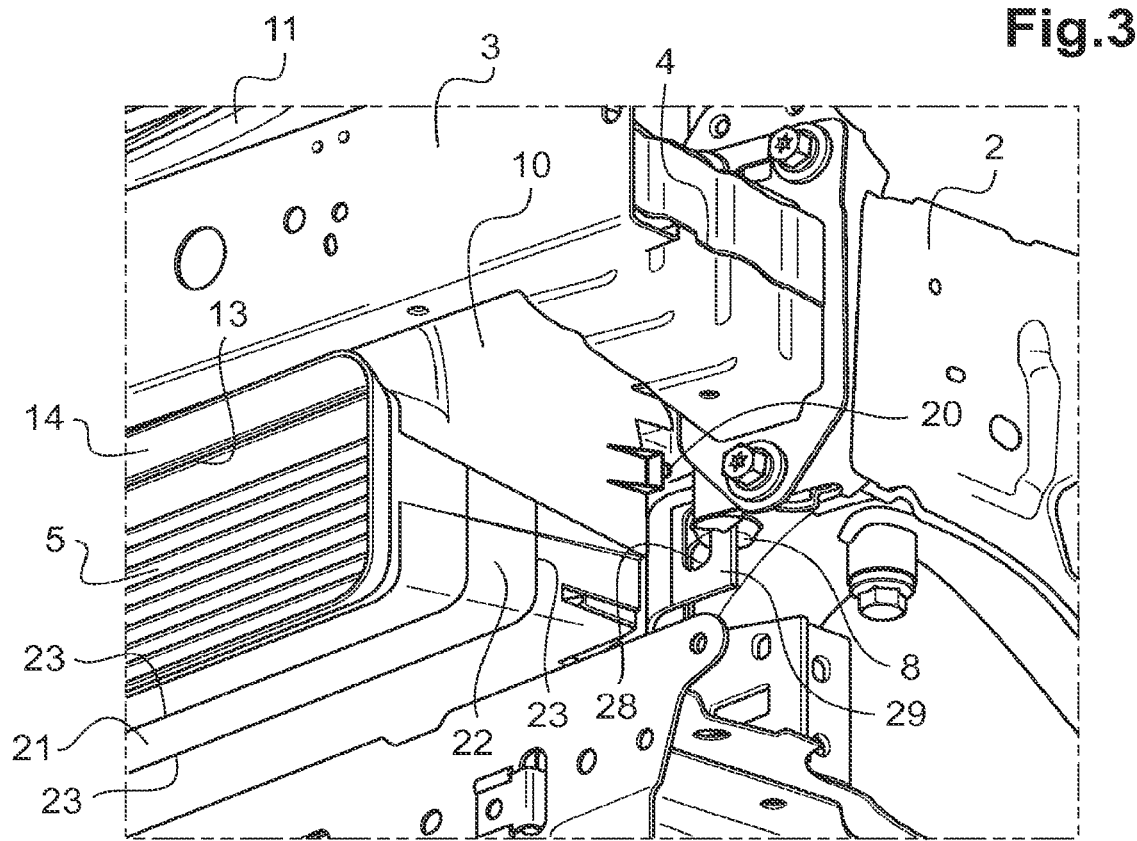
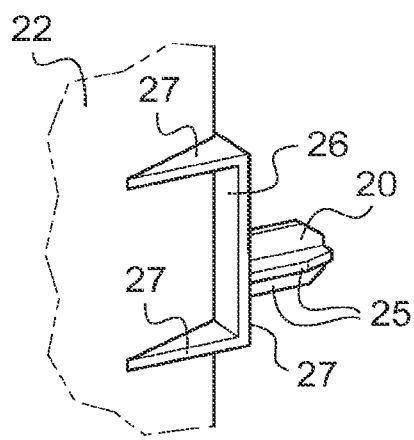
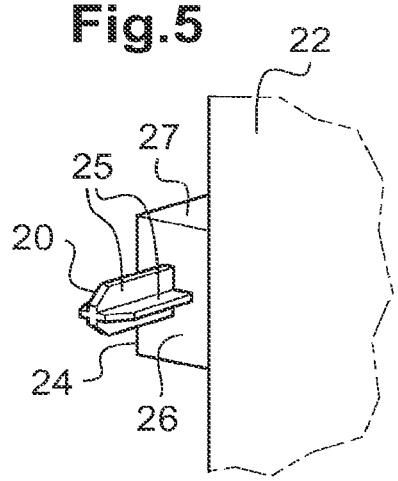

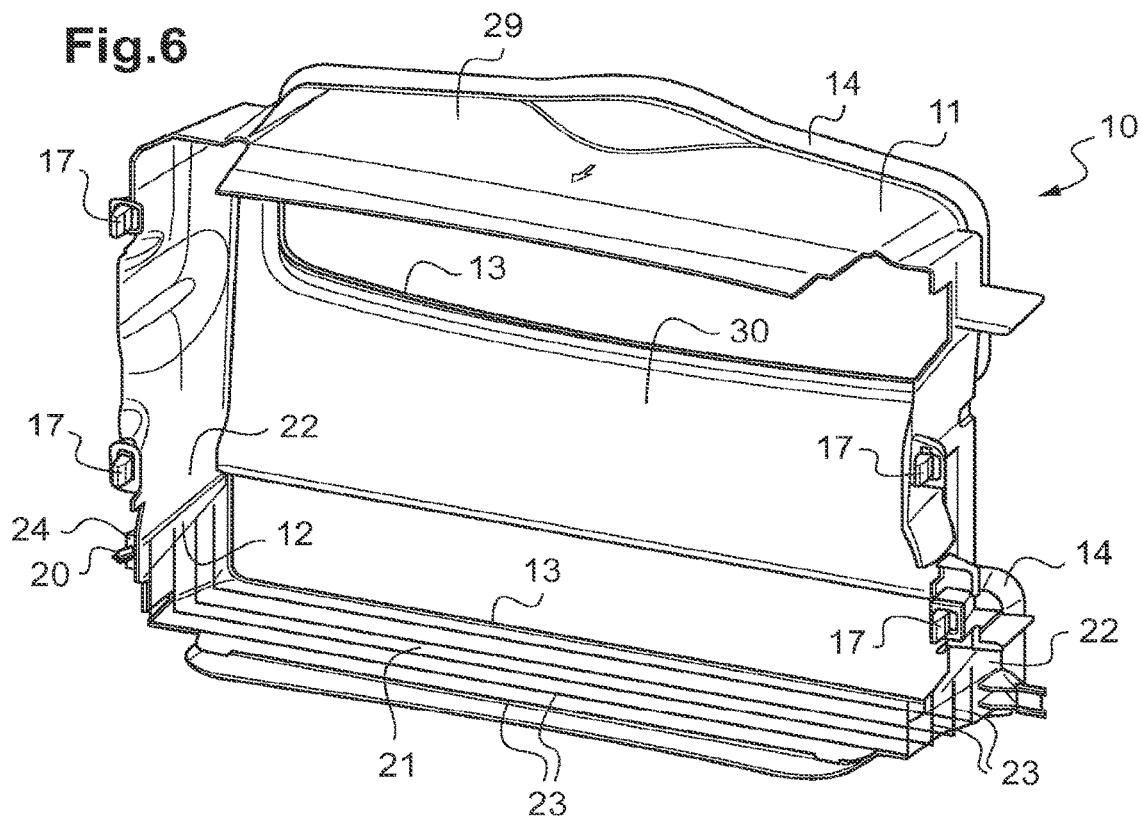
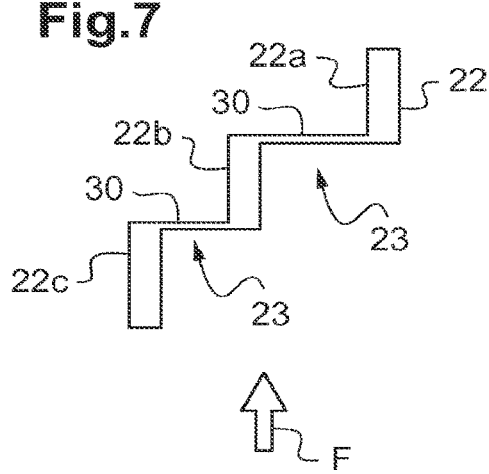
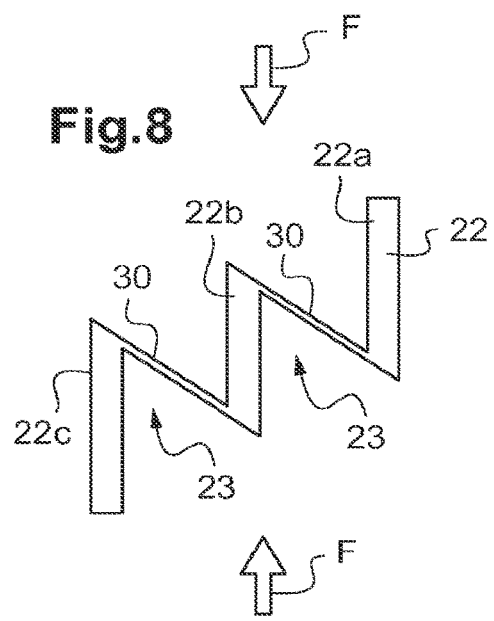

TELESCOPICALLY CRUSHABLE AIR GUIDE FOR A MOTOR VEHICLE ENGINE RADIATOR AND VEHICLE PROVIDED WITH SAME

BACKGROUND

The present invention relates to an air guide which is placed in the region of the functional front face of a motor vehicle engine. It involves channeling the air which is introduced via at least one opening or ventilation grille in the front face or skin of the front bumper of the vehicle in order to guide it to a cooling system which is constituted by an assembly of elements which are assembled in what is referred to as a "cooling set". This term is intended to refer to the assembly of pieces of equipment which are required for cooling of the engine, sometimes stacked in layers or partially superimposed; the cooling set is conventionally composed of the radiator with engine cooling water, the optional CAC ("charge air cooler" used for a turbo radiator) and the condenser. This cooling system is generally located in the region of what is referred to in the field as the "functional front face" (FFF), that is to say, a structure which is located at the front of the engine unit and which serves to support different members, principally the radiator of the engine unit. The functional front face may have multiple forms. In some cases, it is reduced to one or two cross-members, lower and/or upper. In other cases, it constitutes a chassis which has a more or less complex shape which includes the cooling set.

Document FR 2967375 discloses an air guide which is intended to be arranged in front of a cooling system which is provided in an engine compartment of a vehicle, and behind at least one ventilation grille of a front face of the vehicle, the air guide being in the form of a substantially rectangular frame structure which overlaps the transverse impact beam which is arranged at this location of the engine compartment, and at the front of this frame structure, at least one convergent member which is attached to the frame structure. The frame structure is advantageously a component which is common to a whole series of models which have the same engine architecture, whilst the convergent member is a component which is specific to the model in question and which is intended to be completely adapted to the environment of the engine.

Such a construction has to be provided in order to withstand specific types of impacts without bringing about excessively costly repairs. In particular, the RCAR impact is an impact protocol which is imposed by insurance companies. It involves a front impact at one side of the vehicle only (left side in France, right side in countries with right-hand drive). A vertical half-barrier which has an inclination of 10° relative to the transverse plane is projected against the front face of the vehicle at a speed of 16 km/h. Minimum damage has to be generated in the event of such an impact in order to minimize the repair costs. This applies in particular to the front functional face of the vehicle which includes the radiator (condenser) of the vehicle.

In known solutions, fixing rods which ensure the fixing of the front functional face to the structure (longitudinal members, cradle) were susceptible to breaking in the event of the impact, involving a retraction of the functional front face and the radiator, without damaging them. Only the fixing rods had to be replaced during the repair operation. In these known devices, the air guides which are interposed between the air inlet grille and the radiator were relatively rigid, contributing to transmitting the forces to the rear on the functional front face and moving it.

These solutions require that a clearance space be kept free at the rear of the functional front face. The large number of members which have to be accommodated in the engine compartment makes this solution unfavorable and it is desirable to find an alternative solution which enables, even in the absence of clearance space at the rear, the conditions of the RCAR impact test to be complied with. This is the object of the invention.

BRIEF SUMMARY

The object of the invention is achieved with an air guide which is intended to collect the air from a grille which is located at the front of a vehicle engine compartment to a vertical radiator which is located in the engine compartment and which is fixed to a vehicle chassis, the air guide being in the form of a main casing which comprises an upper casing and a lower casing which each comprise an opening toward the front which is intended to receive the air, the main casing comprising means for fixing to the vertical radiator, the lower casing comprising at least one substantially horizontal lower wall and two substantially vertical lateral walls, characterized in that the lower casing comprises means for axial and transverse abutment of the rear portion of the lower casing of the air guide relative to the chassis of the vehicle, at least in a lateral region of the lower casing and, on the other hand, a local structure for controlled preferred compression of the walls of the lower casing, at least in a lower portion of the lateral region of the lower casing.

Preferably, in order to produce the axial and transverse abutment means of the rear portion of the lower casing of the air guide relative to the chassis of the vehicle, the lower casing laterally comprises at the rear a longitudinal indexing and anchoring pin which is capable of engaging in a transverse vertical opening which is formed in a component which is fixedly joined to the chassis of the vehicle.

Preferably, the local structure for controlled preferred compression of the walls of the lower casing is produced by the fact that at least a portion of at least one of the lower wall and/or lateral walls of the lower casing comprises a structure for telescopic crushing of the walls under a longitudinal pushing action which exceeds a specific threshold.

In this manner, in the event of an impact of a specific intensity, the pushing action transmitted by the air guide from the bodywork of the vehicle places the lower casing in abutment against a resistant element of the chassis and therefore prevents the axial displacement thereof beyond this abutment, and also blocks any lateral deflections thereof, as a result of the indexing and anchoring pin. Not being able to retract, the air guide is crushed in the structural zones with telescopic crushing, that is to say, in zones in which the geometry and the thickness of the walls are selected to lead to a crushing in the form of nesting of various wall sections one inside the other. In this manner, according to the invention, the air guide has been made both fusible and fixed in position in the event of an impact, both axially and transversely, at least in the zone of the lower casing, that is to say, in practice, in the zone located below the impact beam, a zone which receives the pushing action in the event of an RCAR impact.

In order to carry out the localized and controlled crushing operation, the wall of the lower casing, in the zones involved in the crushable structure, is advantageously formed by a plurality of sections of relatively rigid wall which are offset transversely and connected by walls or membranes which are relatively flexible and/or fragile, for example, thinned walls, which form a right angle or an acute angle relative to the main wall of the different sections. This arrangement enables the sections to move longitudinally relative to each other in order to fit together, by means of deformation or even breakage of the flexible connection walls. This fitting enables the energy of the impact to be absorbed and is carried out in a localized and controlled manner, which then enables the repair by changing the air guide.

The requirements of the RCAR impact test impose a repairability at one side only of the vehicle (the side of the driver). It is therefore possible to provide the arrangement of the invention, that is to say, the blocking on the chassis by means of a pin and the crushable casing wall structure, only at one side of the air guide. If the architecture of the vehicle allows, it is also possible to provide it at both sides, which makes it compatible with all types of drive (left-hand or right-hand).

The longitudinal indexing and anchoring pin, which is capable of engaging in a transverse vertical opening formed in a component which is fixedly joined to the chassis of the vehicle, enables both an axial abutment to be formed for the air guide and a centering system to be constituted which counteracts the bursting of the air guide under the pushing action. According to the invention, this pin may already be in place in the opening thereof which is connected to the chassis as soon as it is assembled, but it may also, according to an original feature of the invention, be mounted remote from the opening, longitudinally at the front thereof, and may be introduced into the centering opening only in the event of the impact, under the action of the pushing force which is applied to the air guide. This solution may be advantageous in accordance with the architecture of the engine compartment.

The invention also relates to a vehicle which comprises a chassis and an engine compartment in which there is located a vertical radiator which is fixed to the vehicle chassis, at the front of which there is placed an air guide which is intended to collect the air from a grille which is located at the front of a vehicle engine compartment to the radiator, characterized in that the air guide is in accordance with what has been described. As mentioned above, this vehicle may be such that the pin of the air guide is, during assembly, located at least partially outside the vertical transverse opening which is connected to the chassis of the vehicle. It is accommodated and blocked in the opening only in the event of an impact.

BRIEF DESCRIPTION OF THE DRAWINGS

Other features and advantages of the invention will be appreciated from the following description. Reference may be made to the appended drawings, in which:

FIG. 3 is a perspective, three-quarter bottom view of an enlarged detail of the lower casing of the air guide of the invention in the environment of FIG. 1, FIGS. 4 and 5 are detailed perspective views of the front and the rear of the pin present on the lower casing of FIG. 3 for abutment and fixing in the event of an impact, FIG. 6 is a perspective rear view of the air guide of the invention, FIGS. 7 and 8 are schematic views showing the constitution of the breakable zones formed in the walls of the lower casing of the air guide of FIG. 6.

DETAILED DESCRIPTION

Figure 1:
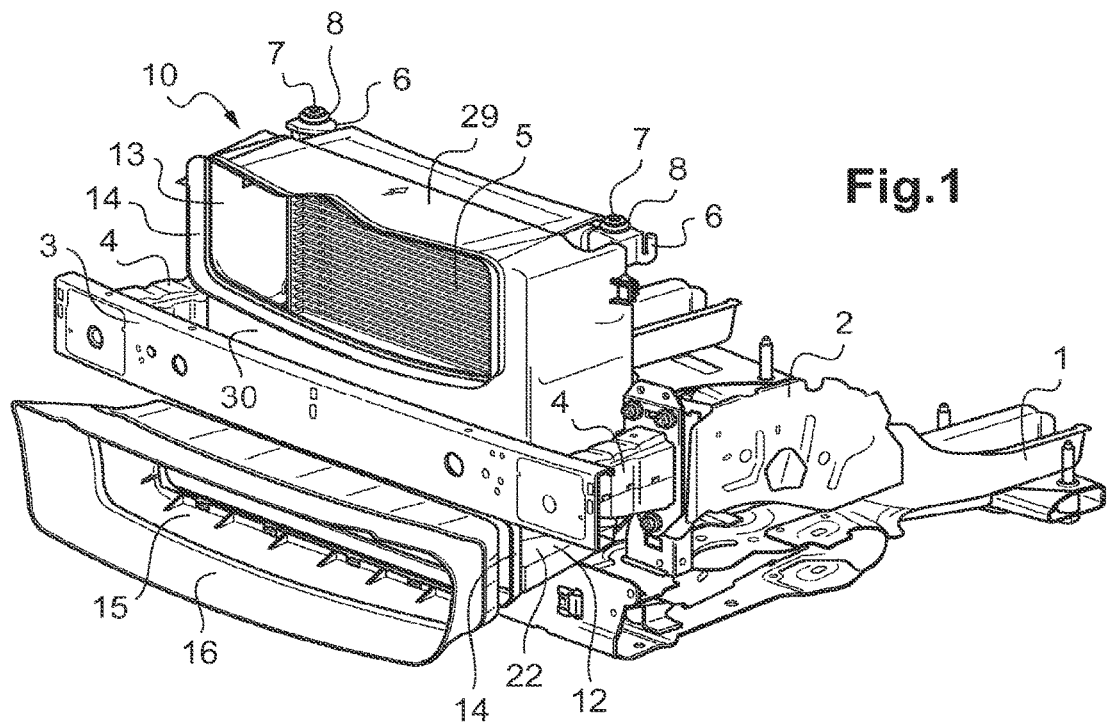
FIG. 1 is a three-quarter perspective front view of the front portion of a motor vehicle engine compartment, with the structural elements and the radiator thereof, and an air guide to which the invention is applied.
Figure 2:
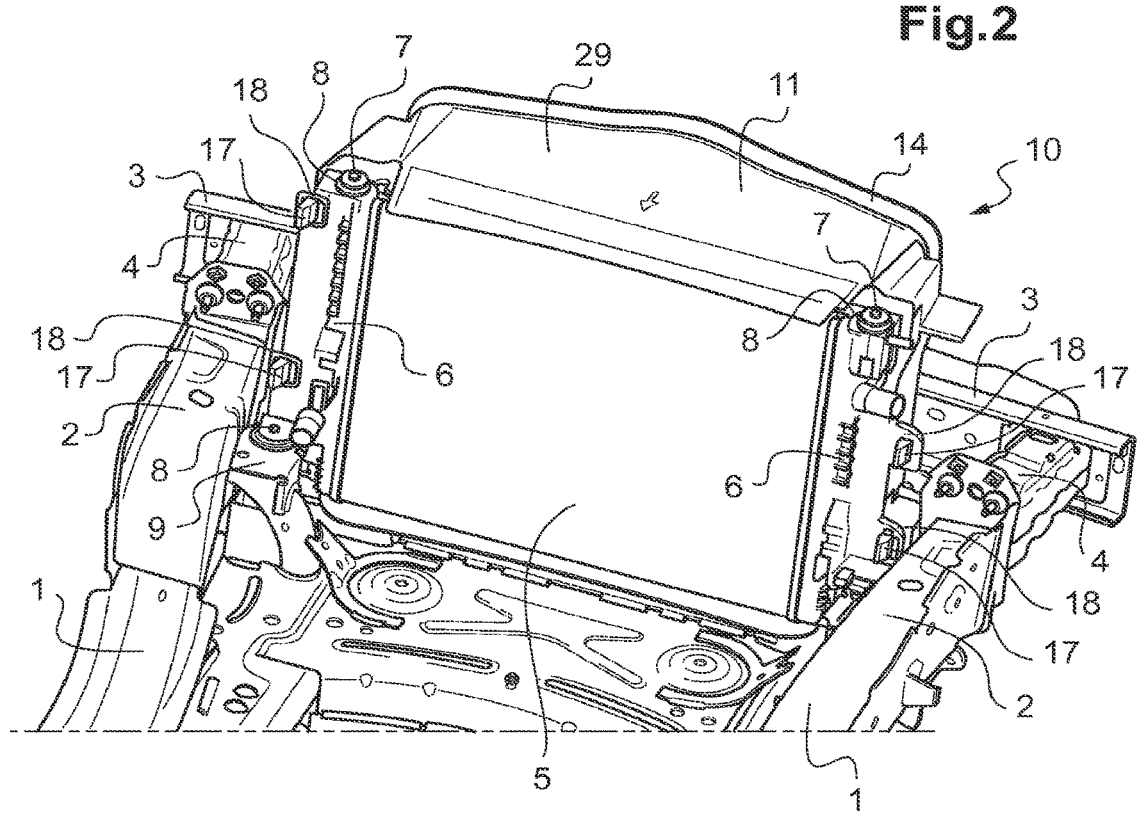
FIG. 2 is a three-quarter perspective rear view of the front portion of the engine compartment of FIG. 1, showing the rear of the radiator and the air guide to which the invention is applied.

FIGS. 1 and 2 show the front portion of the chassis structure of a vehicle, formed by two longitudinal members 1 which rise upward at the front 2 thereof, and which are joined together at the front in the transverse direction by the end cross-member or impact beam 3 which is fixed by means of supports 4. The assembly of structural components is not illustrated in the drawing for reasons of simplification, in particular the lower and upper cross-members which are connected to the longitudinal members which support or which are integrated in the functional front face which includes the cooling casing and in particular the vertical radiator 5, 6. This is formed by its vertical transverse exchanger 5 which is surrounded by the two vertical lateral water tanks 6. The radiator 5, 6 is fixed to the chassis by means of four rods 7, respectively, two upper rods which can only be seen in FIGS. 1 and 2, and two lower rods which cooperate with the chassis structure by means of resilient studs 8 of rubber or elastomer material. The upper rods 7 cooperate with the upper cross-member which is not illustrated, whilst the lower rods are introduced into openings of a portion 9 of the cradle which is carried by the longitudinal members 1.

At the front of the radiator 5, 6 an air guide 10 is formed by a main casing which is completely open toward the open position and delimited by a substantially rectangular frame which is formed by two lateral walls 22, a lower wall 21 and an upper wall 29. This frame delimits, as a result of a horizontal central front wall 30 which is intended to extend just behind the end cross-member 3, an upper casing 11 and a lower casing 12 above and below the cross-member 3, respectively.

Each casing 11, 12 comprises at the front a wide rectangular opening 13 which is bordered by a sealing lip 14 which is intended to enable the respective front convergent members 15 to be assembled in an air-tight manner. These lips may be of the type known per se which is adapted to be applied against an opposing surface under the action of the pressure of the air received in the air guide and therefore to reinforce the sealing as a result of the simple fact of the internal pressure of the air. Only one convergent member, the lower convergent member 15, has been illustrated in the drawings in the state not mounted in the lower casing 12. It is itself bordered at the front by a wide flexible zone 16 for adapting to the front bumper of the vehicle which is not illustrated (cf. document FR 2967375). The convergent member(s) 15 press(es) behind one or more grilles which are provided in the bumper, at the front of the vehicle, in order to collect the air and to guide it to the radiator via the casing of the air guide. The flexible zone 16 not only enables the morphological adaptation of the convergent member 15 to the bumper but is also capable of absorbing the energy of very small impacts.

The upper casing 11 and lower casing 12 may be contiguous and may communicate as illustrated in FIG. 1. They may have a common front face which is located entirely behind the cross-member 3, also as illustrated in FIG. 1.

However, the casings 11, 12 could also overlap the cross-member 3, not be in communication or communicate only at the rear portion thereof.

The frame of the guide 10 forms a rigid component which is substantially rectangular and has a given thickness, for example, produced from molded plastics material (for example, of polypropylene), optionally with local reinforcements of plastics material or metal.

The air guide 10 is fixed to the radiator 5, 6 by means of resilient lugs 17 (cf. FIGS. 2 and 6) which are snap-fitted in rectangular openings provided on lateral portions 18 of the water tanks 6 of the radiator 5, 6.

The assembly of these arrangements is known. In the known constructions of this type, the upper and lower rods 7 for fixing the radiator to the chassis are breakable. In the event of an impact of a significant magnitude, and in particular an RCAR impact, the forces are transmitted from the front of the air guide to the radiator then from the radiator to the rods 7 which, being fragile, break, which enables the radiator to retract into the unit without generally being damaged by the impact itself. It is sufficient to change the rods 7 and to reposition the radiator with new rods in order to repair the damage connected with the impact. However, this retraction of the radiator 5, 6 is possible only if there is space available at the rear of the radiator.

An object of the invention is to provide a solution for the instance in which the spatial requirement of the engine compartment is such that there is insufficient space available at the rear of the radiator, and therefore in which the retraction is not possible. It is therefore necessary to find a solution which enables the absorption of the impact without damaging the radiator.

To this end, the air guide 10 of the invention is configured so as to be compressible in a selective and controlled manner, at least in the lateral lower portion thereof which is involved in an RCAR impact. To this end, the main casing and, more specifically, the lower casing 12 of the air guide 10 comprises, on the one hand, at the rear a pin 20 for indexing and anchoring the casing to the chassis of the vehicle and, on the other hand, at least one breakable wall with telescopic folding. The term "telescopic folding" is intended to be understood to be a structure which enables crushing by the walls or more specifically portions/sections of walls being nested one in the other. These features are set out in detail in FIGS. 3 to 8.

It is possible to see in FIG. 3 the lateral portion of the end cross-member 3 which is attached by means of a support 4 to the end 2 of the longitudinal member, and it is possible to see the lower casing 12 whose front opening 13 bordered by the lip 14 allows the exchanger 5 of the radiator to be seen. The lower horizontal wall 21 and the lower portion of the lateral wall 22 of the lower casing 12 comprises folds 23 for a breakable telescoping action or accordion-like contraction folds which will be set out in detail below.

Furthermore, the vertical lateral wall 22 comprises a support 24 which is intended for the above-mentioned horizontal pin 20. This pin 20 which is arranged in the longitudinal direction of the vehicle is formed, for example, by four edges 25 which are chamfered at the end and arranged at 90° relative to each other, and which protrude at the rear of the transverse vertical surface 26 of the support 24, which surface is welded with support gussets 27 to the wall 22.

The pin 20 is intended to be introduced, at least in the event of an impact, but optionally also in the normal state, before impact, into an opening 28 which is formed in a plate 29 which is securely fixed to a portion of the chassis. The position of the pin 20 at the base of the main casing, in the region of the lower casing 12, just below the impact beam 3, is substantially in the center of the pushing force observed in an RCAR impact.

The opening 28 has a size greater than that of the pin 20 in order to enable it to be guided and introduced in the event of an impact. It is possible to provide a wider opening than the pin 20 in order to allow the possibility of limited lateral deflection; this is particularly advantageous if the pin 20 is mounted so as to be outside the opening 28 and to be introduced only in the event of an impact. As a result of this opening 28, the pin 20 indexes relative to the chassis, at least in the event of an impact, the position of the lower casing 12 in this region. It provides an axial abutment for the possible movement of the lower casing 12 in the event of the impact, and it also limits its lateral or vertical displacement, with reference to the chassis and no longer to the radiator 5, 6, so that the radiator 5, 6 may remain in place in spite of the impact, the pushing forces finally being absorbed and blocked by the axial abutment on the chassis and no longer being transmitted via the radiator 5, 6.

FIG. 6 shows from the rear the air guide 10 which is formed by two upper and lower casings 11 and 12 which are fixedly joined to each other via their front face which is provided with the openings 13 and via their lateral walls 22. FIG. 6 shows the fittings 17 of the air guide 10 with respect to the radiator. Furthermore, the pin 20 and the support 24 thereof have been illustrated at one side of the air guide 10. A single pin 20 has been illustrated at one side in this instance, but it is possible to provide a pin 20 at each side of the air guide 10 in order to equip as desired a car for left-hand drive or right-hand drive. FIG. 6 also shows the folds or steps 23 for telescopic action by means of articulation or breakage, formed in all or a portion of the lateral walls 22 (at least in the region of the base of the lower casing 12) and lower wall 21.

Two embodiments of these folds or steps 23 are illustrated in FIGS. 7 and 8 which show the wall 22 (for example) produced in three sections 22a, 22b, 22c which may fit one inside the other. These sections 22a, 22b, 22c are joined by means of walls or membranes 30 which are thinner than the wall 22 and therefore more flexible and/or more fragile. The wall 22 has, for example, a thickness of 2 mm whilst the membranes have a thickness between 0.5 mm and 1.5 mm. The membranes 30 may form linear steps as illustrated in FIG. 7, or an acute angle with the wall 22 as illustrated in FIG. 8. The membranes 30 may act, depending on their location and constitution, as articulations or as fusible connections between the different wall sections 22. Under the action of a pushing force F resulting from an RCAR impact, the shearing will fold, or even break, the intermediate flexible or breakable membranes 30 so that the sections 22a, 22b, 22c will be able to fit in a telescopic manner one inside the other. The section 22a located at the rear side of the vehicle is substantially fixed in position since it is blocked on the chassis as a result of the pin 20. The most advanced sections 22b and 22c are fitted into the section 22a, either internally (the section 22a is the widest and 22c the smallest), or externally (the section 22a is the smallest and 22c the widest).

The invention claimed is:

1. A vehicle, comprising:
  a chassis and an engine compartment in which there is located a vertical radiator which is fixed to the chassis, at a front of which there is placed an air guide to collect air from a grille, the air guide comprising a main casing including an upper casing and a lower casing which each comprise an opening toward the front to receive the air, the main casing comprising means for fixing to the vertical radiator, the lower casing comprising at least one substantially horizontal lower wall and two substantially vertical lateral walls, the lower casing comprising means for axial and transverse abutment of a rear portion of the lower casing of the air guide relative to the chassis of the vehicle, at least in a lateral region of the lower casing and, a local structure for controlled preferred compression of the walls of the lower casing, at least in a lower portion of the lateral region of the lower casing, wherein, in order to produce the means for axial and transverse abutment of the rear portion of the lower casing of the air guide relative to the chassis of the vehicle, the lower casing laterally comprises, at a rear of the lower casing, a longitudinal indexing and anchoring pin which is capable of engaging in a transverse vertical opening which is formed in a component which is fixedly joined to the chassis of the vehicle, and wherein the air guide is connected to the chassis such that the pin of the air guide is located outside of the transverse vertical opening which is connected to the chassis of the vehicle and is only to be introduced into the transverse vertical opening in an impact of the vehicle.

2. The vehicle as claimed in claim 1, wherein the local structure for controlled preferred compression of the walls of the lower casing includes membranes that join sections of the walls of the lower casing, the membranes being thinner than the walls of the lower casing.

3. The vehicle as claimed in claim 2, wherein each of the membranes forms a linear step.

4. The vehicle as claimed in claim 2, wherein each of the membranes forms an acute angle with the walls of the lower casing.

5. The vehicle as claimed in claim 1, wherein the pin includes four edges arranged at 90° relative to each other and each of the four edges of the pin includes a chamfered end.

6. The vehicle as claimed in claim 5, wherein each of the four edges of the pin includes a chamfered end.

7. The vehicle as claimed in claim 1, wherein the pin is attached to one of the lateral walls via a support gusset.

8. An air guide to collect air from a grille located at a front of a vehicle engine compartment to a vertical radiator located in the engine compartment and which is fixed to a vehicle chassis, comprising:

a main casing including an upper casing and a lower casing which each comprise an opening toward the front to receive the air, the main casing comprising means for fixing to the vertical radiator, the lower casing comprising at least one substantially horizontal lower wall and two substantially vertical lateral walls, the lower casing comprising means for axial and transverse abutment of a rear portion of the lower casing of the air guide relative to the chassis of the vehicle, at least in a lateral region of the lower casing and, a local structure for controlled preferred compression of the walls of the lower casing, at least in a lower portion of the lateral region of the lower casing, wherein, in order to produce the means for axial and transverse abutment of the rear portion of the lower casing of the air guide relative to the chassis of the vehicle, the lower casing laterally comprises, at a rear of the lower casing, a longitudinal indexing and anchoring pin which is capable of engaging in a transverse vertical opening which is formed in a component which is fixedly joined to the chassis of the vehicle, and wherein the local structure for controlled preferred compression of the walls of the lower casing includes membranes that join sections of the walls of the lower casing, the membranes being thinner than the walls of the lower casing.

9. The air guide as claimed in claim 8, wherein the local structure for controlled preferred compression of the walls of the lower casing is produced by at least a portion of at least one of the lower wall and/or lateral walls of the lower casing comprising a structure for telescopic crushing of the walls under a longitudinal pushing action which exceeds a specific threshold.

10. The air guide as claimed in claim 9, wherein the wall of the lower casing, in zones involved in the crushable structure, is formed by a plurality of sections of relatively rigid wall which are offset transversely and connected by connection walls formed by the membranes which are relatively flexible or fragile, which enables the relatively rigid wall sections to move longitudinally relative to each other in order to fit together, by means of deformation or breakage of the connection walls.

11. The air guide as claimed in claim 10, wherein the connection walls are thinned walls which form a right angle or an acute angle relative to a main wall of the different sections.

12. The air guide as claimed in claim 8, wherein the pin includes four edges arranged at 90° relative to each other.

13. The air guide as claimed in claim 12, wherein each of the four edges of the pin includes a chamfered end.

14. The air guide as claimed in claim 8, wherein the membranes form linear steps.

15. The air guide as claimed in claim 8, wherein the means for axial and transverse abutment and the local structure for controlled preferred compression of the walls of the lower casing are provided only at one side of the lower casing.

16. The air guide as claimed in claim 8, wherein the means for axial and transverse abutment and the local structure for controlled preferred compression of the walls of the lower casing are provided at two sides of the lower casing.

17. A vehicle, comprising:

a chassis and an engine compartment in which there is located a vertical radiator which is fixed to the chassis, at the front of which there is placed the air guide as claimed in claim 8.

18. The air guide as claimed in claim 8, wherein the membranes form an acute angle with the walls of the lower casing.

19. The air guide as claimed in claim 8, wherein the pin is attached to one of the lateral walls via a support gusset.

* * * * *